(12) United States Patent
Yun et al.

(10) Patent No.: US 7,565,260 B2
(45) Date of Patent: Jul. 21, 2009

(54) APPARATUS AND METHOD FOR SETTING A GYROSCOPE ZERO POINT

(75) Inventors: Doo-Hee Yun, Yongin-si (KR);
Young-Khon Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 460 days.

(21) Appl. No.: 11/249,072

(22) Filed: Oct. 12, 2005

(65) Prior Publication Data

US 2007/0136019 A1 Jun. 14, 2007

(30) Foreign Application Priority Data

Oct. 12, 2004 (KR) ...................... 10-2004-0081418

(51) Int. Cl.
*G01L 9/00* (2006.01)
(52) U.S. Cl. ...................................... 702/151
(58) Field of Classification Search ................ 702/151; 701/214; 340/988
See application file for complete search history.

(56) References Cited

U.S. PATENT DOCUMENTS

| | | | | |
|---|---|---|---|---|
| 5,331,903 A * | 7/1994 | Elia | ........................ | 105/199.2 |
| 5,469,158 A * | 11/1995 | Morita | ........................ | 340/988 |
| 6,658,353 B2 * | 12/2003 | Shimizu et al. | ............. | 701/214 |
| 2004/0236596 A1 * | 11/2004 | Chowdhary et al. | ............ | 705/1 |

* cited by examiner

*Primary Examiner*—Tung S Lau
*Assistant Examiner*—Xiuquin Sun
(74) *Attorney, Agent, or Firm*—The Farrell Law Firm, LLP (57) ABSTRACT

Disclosed are an apparatus and a method for computing a position of a moving entity, and an apparatus and method for setting a gyroscope zero point or a gyroscope zero point reference value. In the apparatus for setting the gyroscope zero point, a gyroscope outputs a signal of angular velocity in the form of voltage. A global positioning system (GPS) receiver receives a GPS signal. An analog-to-digital (A/D) converter digitizes the voltage output from the gyroscope. A controller detects a speed and a direction angle of a vehicle from the received GPS signal, determines if the vehicle is traveling in a straight line, and filters the voltage output from the gyroscope to obtain a gyroscope zero point reference value if the vehicle is traveling in the straight line.

5 Claims, 8 Drawing Sheets

APPARATUS AND METHOD FOR SETTING A GYROSCOPE ZERO POINT

PRIORITY

This application claims priority to an application entitled "APPARATUS AND METHOD FOR SETTING A GYROSCOPE ZERO POINT", filed in the Korean Intellectual Property Office on Oct. 12, 2004 and assigned Serial No. 2004-81418, the contents of which are incorporated herein by reference.

BACKGROUND OF THE INVENTION

1. Field of the Invention

The t invention relates generally to an apparatus and method for computing a position of a moving entity, and more particularly to an apparatus and method for setting a gyroscope zero point or a gyroscope zero point reference value.

2. Description of the Related Art

Telematics terminals mounted in vehicles provide drivers with various information associated with traffic guidance, current events, finance, etc. Many telematics terminals use a global positioning system (GPS) and/or a dead reckoning (DR) sensor to compute a vehicle's position. The DR sensor can use a distance sensor capable of measuring a traveling distance and a direction sensor capable of measuring a traveling angle. The direction sensor can use a gyroscope.

A zero point bias must be accurately measured such that the displacement of a direction angle can be correctly computed. The zero point bias is referred to as the zero point, and varies according to the type of gyroscope or installation environment. In practice, when the gyroscope zero point is measured, vibration is a serious problem. Accordingly, when the gyroscope zero point is measured, a technique robust to vibration is very important.

Figure 1:
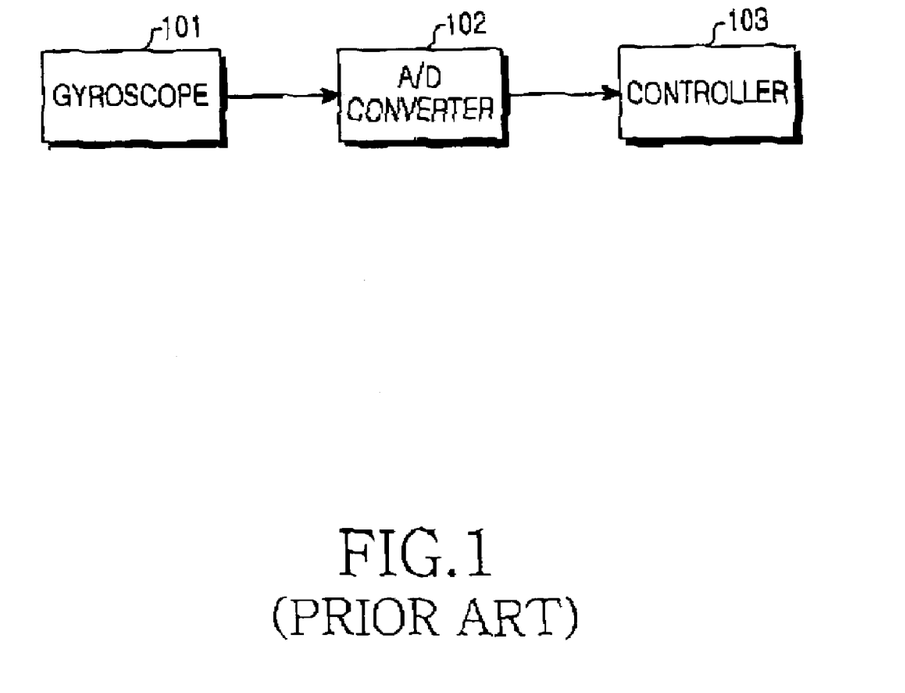
FIG. 1 is a block diagram illustrating a conventional apparatus for setting a gyroscope zero point.

FIG. 1 is a block diagram illustrating a conventional apparatus for setting the gyroscope zero point.

The conventional apparatus for setting the gyroscope zero point includes a gyroscope 101 for outputting a signal of angular velocity in the form of voltage, an analog-to-digital (A/D) converter 102 for converting the voltage output from the gyroscope 101, and a controller 103 for processing the A/D converted gyroscope output. The controller 103 can be implemented by a microprocessor. The vibration component Vstop that is typically relevant to a vehicle-mounted gyroscope when the vehicle is stopped is defined in Equation 1 below.

$$V_{stop} = V_b + \epsilon_{thermal\_noise} + \epsilon_{vibration} \quad \text{Equation (1)}$$

Where, $V_b$ is a true gyroscope bias component, $\epsilon_{thermal\_noise}$ is a thermal noise component representing a noise level of a gyroscope zero point output measured in a non-vibration and non-rotation state, and $\epsilon_{vibration}$ is a component due to vehicle vibration. Accordingly, when a vehicle is stopped, a $V_b$ value is determined by the magnitude of $\epsilon_{vibration}$. In this case, $\epsilon_{thermal\_noise}$ almost has no deviation between gyroscopes, but $\epsilon_{vibration}$ has a significant deviation according to the kind of vehicle in which the gyroscope is mounted and/or according to vehicle wear. For example, the magnitude of $\epsilon_{vibration}$ in a car in which a gasoline engine is mounted is smaller than that of $\epsilon_{vibration}$ in a truck in which a diesel engine is mounted. That is, because the conventional apparatus uses a fixed noise level to set the gyroscope zero point, there is a problem in that the conventional apparatus cannot be applied to all vehicles. Accordingly, a fixed noise level value must be optimized according to the type of vehicle. When the fixed noise level value is determined according to the vehicle model in case of a telematics terminal built in the vehicle as one part of the vehicle when the vehicle is made, the problem can be addressed. However, since an exact determination as to what kind of vehicle an after-market telematics terminal is mounted in cannot be made, the fixed noise level must be set such that it is appropriate to passenger cars, as they comprise the largest number of vehicles on the road.

Figure 2:
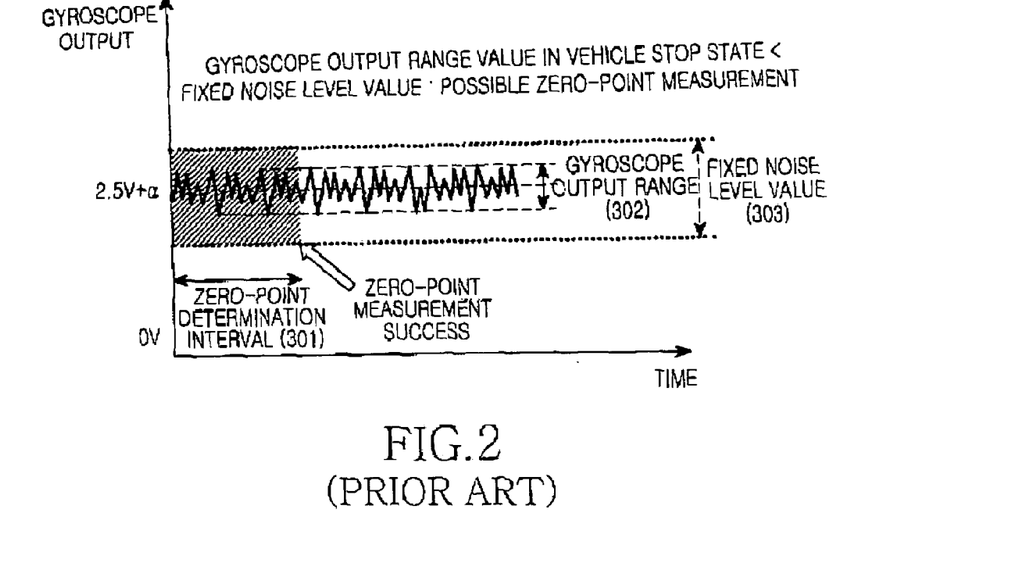
FIG. 2 is a graph illustrating a state in which the zero point of a gyroscope mounted in a vehicle having a small vibration level.

FIG. 2 is a graph illustrating a state in which the zero point of a gyroscope is set in a gyroscope mounted in a vehicle having a small vibration level.

When a vehicle having a small vibration level, such as a passenger car in which a gyroscope is mounted is stopped (i.e., not moving), the gyroscope zero point can be successfully measured because a gyroscope output range value 302 measured in an initial zero point determination interval 301 is smaller than a fixed noise level value 303.

Figure 3:
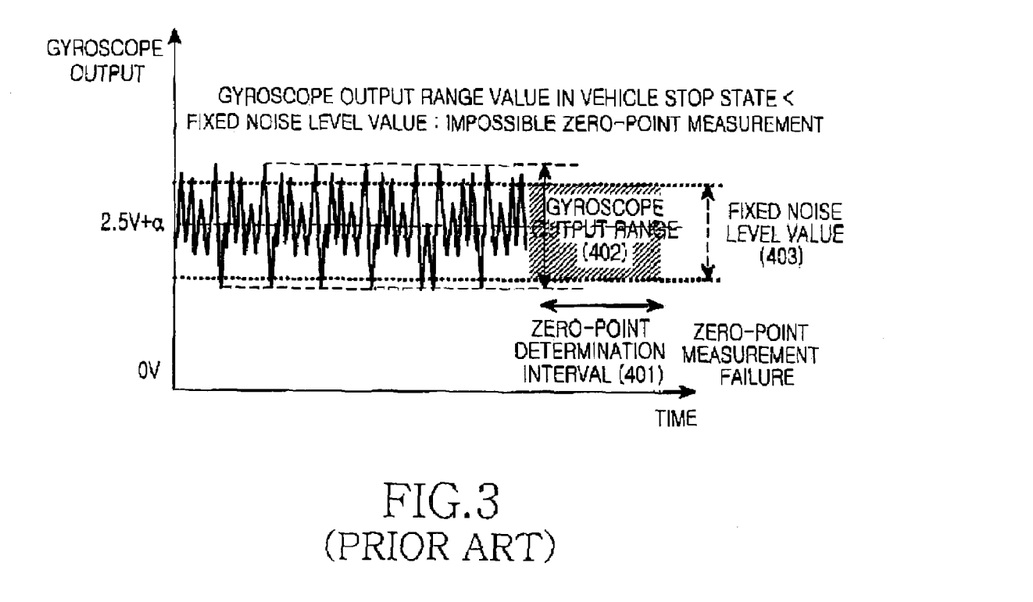
FIG. 3 is a graph illustrating a state in which the zero point of a gyroscope mounted in a vehicle having a large vibration level.

FIG. 3 is a graph illustrating a state in which the zero point of a gyroscope mounted in a vehicle having a large vibration level.

When a vehicle having a relatively large vibration level such as a diesel truck in which a gyroscope is mounted is stopped (i.e., not moving), the gyroscope zero point cannot be measured because a gyroscope output range value 402 measured in an initial zero point determination interval 401, is larger than a fixed noise level value 403.

SUMMARY OF THE INVENTION

Accordingly, the present invention has been designed to solve the above and other problems occurring in the prior art. Therefore, it is an object of the present invention to provide an apparatus and method for successfully measuring a gyroscope zero point or a gyroscope zero point reference value for a gyroscope mounted in a vehicle with large vibration.

In accordance with a first aspect of the present invention, the above and other objects can be accomplished by an apparatus for setting a gyroscope zero point reference value. The apparatus includes a gyroscope for outputting a signal of angular velocity in the form of voltage; a global positioning system (GPS) receiver for receiving a GPS signal; an analog-to-digital (A/D) converter for digitizing the voltage output from the gyroscope; and a controller for detecting a speed and a direction angle of a vehicle from the received GPS signal, determining if the vehicle is traveling in a straight line, and filtering the voltage output from the gyroscope to obtain a gyroscope zero point reference value if the vehicle is traveling in the straight line.

In accordance with a second aspect of the present invention, the above and other objects can be accomplished by a method for setting a gyroscope zero point reference value. The method includes performing global positioning system (GPS) measurement in a predetermined cycle; checking whether a vehicle is traveling in a straight line from a result of the GPS measurement, incrementing a count value associated with the straight-line traveling if the vehicle is traveling in the straight line, and computing a gyroscope zero point reference value according to ZPT_Ref=(N−1)/N*ZPT_Ref+1/N*Mean(Y[0 . . . 9]), where $ZPT_{13}$ Ref denotes a gyroscope zero point reference value, N denotes a smoothing filter constant, and Mean(Y[0 . . . 9]) is a mean value of Y[0] to Y[9] values, each of the Y[0] to Y[9] values being an average of an accumulated value obtained by accumulating a mean value of gyroscope output values measured in a predetermined cycle the predetermined number of times; and determining the count value associated with the straight-line traveling after computing the gyroscope zero point reference value, storing the computed gyroscope zero point reference value in a memory if the count value is larger than N, and waiting for the cycle to be reached if the count value is less than or equal to N.

In accordance with a third aspect of the present invention, the above and other objects can be accomplished by an apparatus for setting a gyroscope zero point. The apparatus includes a gyroscope for outputting a signal indicating angular velocity in the form of a voltage; a global positioning system (GPS) receiver for receiving a GPS signal; an analog-to-digital (A/D) converter for digitizing the voltage output from the gyroscope; and a controller for analyzing the GPS signal, determining if a vehicle is traveling in a straight line, obtaining a gyroscope zero point reference value, comparing a gyroscope output range value with a noise level value in a predetermined cycle, and updating a gyroscope zero point when the gyroscope output range value is less than or equal to the noise level value.

In accordance with a fourth aspect of the present invention, the above and other objects can be accomplished by a method for setting a gyroscope zero point using a memory storing a gyroscope zero point value, a noise level value, and a gyroscope zero point reference value. The method includes determining if the gyroscope zero point value, the noise level value, and the gyroscope zero point reference value are present in the memory, when power is applied; initializing a gyroscope zero point and a gyroscope zero point reference value to the stored values thereof and initializing a noise level to a predetermined multiple of the stored value thereof if the values are present, and initializing only the noise level to a value computed by taking into account a case where vibration is large if the values are absent; sequentially storing, in a plurality of buffers, an average of an accumulated value obtained by accumulating a mean value of gyroscope output values measured in a second time interval for a first time period; obtaining a gyroscope output range value whenever sequentially storing, in the plurality of buffers, an average of an accumulated value obtained by accumulating a mean value of gyroscope output values measured in the second time interval for the first time period after all the buffers are initially filled; updating the noise level to a minimum gyroscope output range value, when the gyroscope output range value is less than or equal to the noise level value; and summing values stored in all the buffers when the noise level is updated, and updating a new gyroscope zero point to a mean value of the stored values.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described in detail herein below with reference to the accompanying drawings.

In the drawings, the same or similar elements are denoted by the same reference numerals even though they are depicted in different drawings.

In the following description made in conjunction with embodiments of the present invention, a variety of specific elements such as a cycle, a noise level value, etc. are shown. The description of such elements has been made only for a better understanding of the present invention. Those skilled in the art will appreciate that the present invention can be implemented without using the above-mentioned specific elements. Additionally, in the following description, a detailed description of known functions and configurations incorporated herein will be omitted for conciseness.

Figure 4:
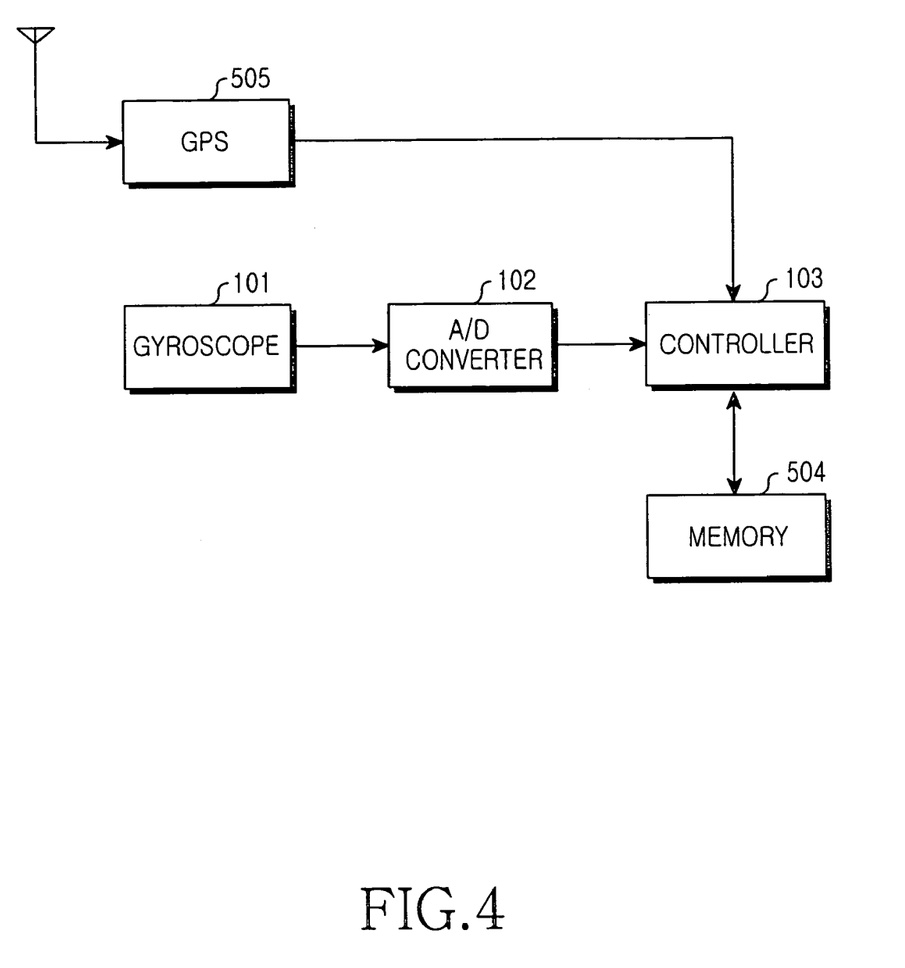
FIG. 4 is a block diagram illustrating an apparatus for setting a gyroscope zero point in accordance with an embodiment of the present invention.

FIG. 4 is a block diagram illustrating an apparatus for setting a gyroscope zero point in accordance with an embodiment of the present invention.

The apparatus includes a gyroscope 101, an analog-to-digital (A/D) converter 102, a controller 103, a memory 504, and a global positioning system (GPS) receiver 505.

The gyroscope 101 outputs a signal of angular velocity in the form of voltage. The A/D converter 102 converts the voltage into a digital value capable of being processed by the controller 103. The memory 504 stores a gyroscope zero point value, a noise level value, and a gyroscope zero point reference value ZPT_Ref. If the values are stored, the probability of setting a gyroscope zero point becomes high when the apparatus is turned on. The memory 504 can be implemented by a static random access memory (SRAM) or flash memory. The controller 103 analyzes a GPS signal received from the GPS receiver 505 to detect a speed and a direction angle of a vehicle, etc. According to a result of the detection, a determination is made as to whether the vehicle is traveling in a straight line. When the vehicle is traveling in the straight line, an obtained gyroscope output value is filtered, and then a gyroscope zero point reference value ZPT_Ref is roughly computed, such that an error of gyroscope zero point setup can be reduced.

Figure 5A:
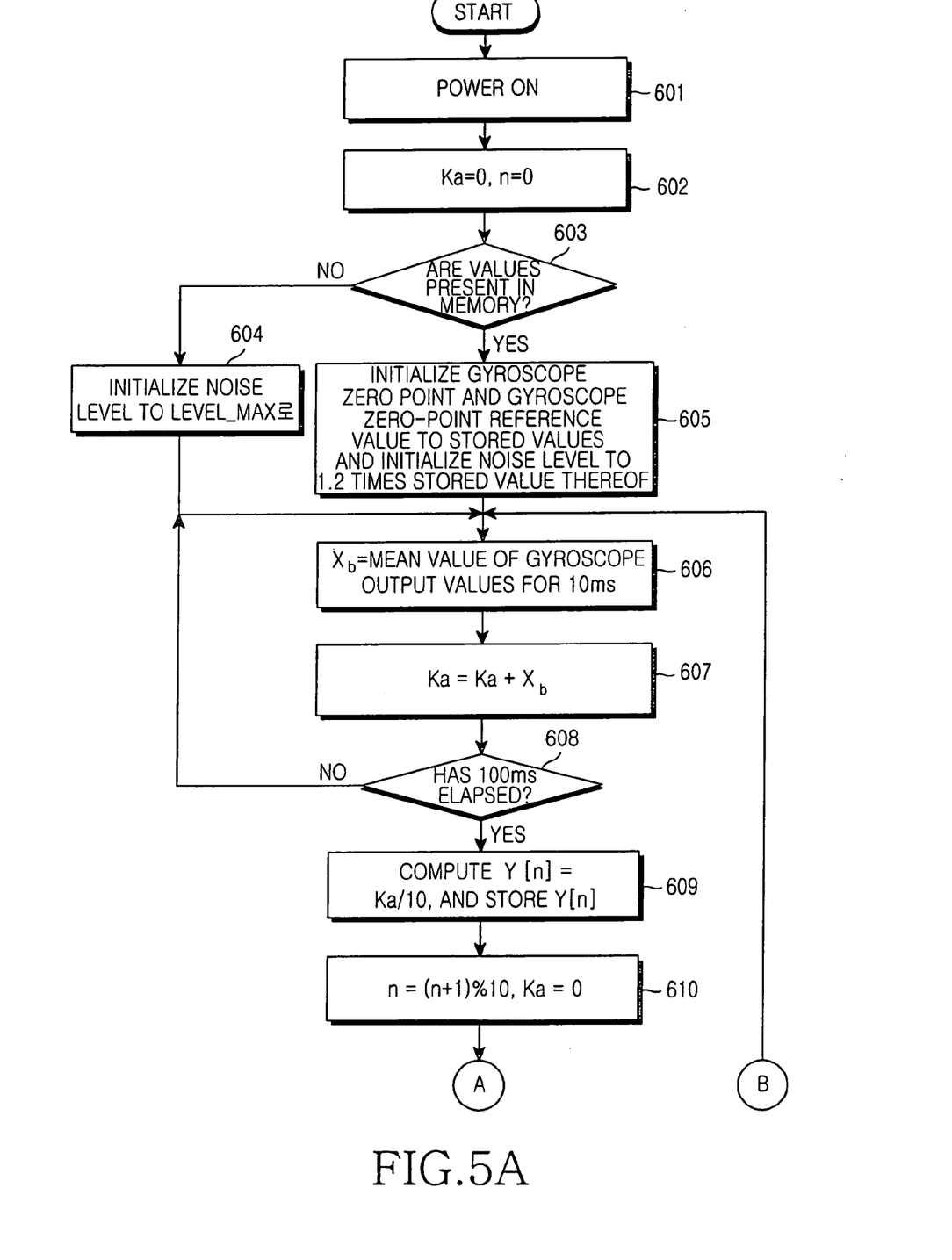
FIGS. 5A and 5B are flow charts illustrating a method for setting a gyroscope zero point in accordance with an embodiment of the present invention.
Figure 5B:
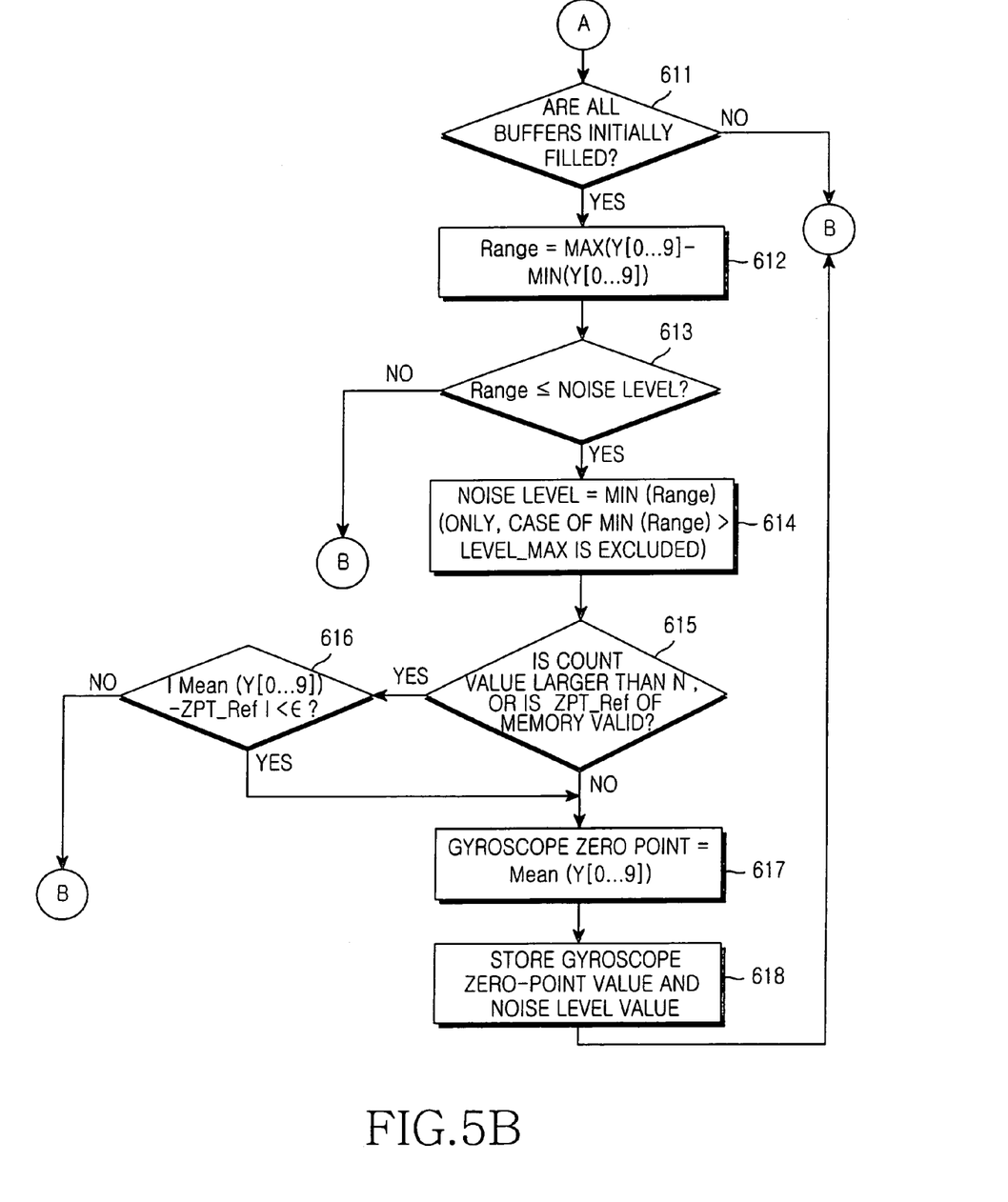

FIGS. 5A and 5B are flow charts illustrating a method for setting a zero point of a gyroscope in accordance with an embodiment of the present invention.

When power is applied in step 601, the controller 103 sets parameters Ka and n to 0 in step 602. The parameter Ka represents a value obtained by accumulating a mean value of gyroscope output values measured in a cycle of 10 ms for 100 ms. The parameter n is an index incremented by 1 whenever 10 ms elapses.

In step 603, the controller 103 checks if a gyroscope zero point value, a noise level value, a gyroscope zero point reference value ZPT_Ref, etc. have been stored in the memory 504. If these values have been stored, the gyroscope zero point value and the gyroscope zero point reference value ZPT_Ref are initialized to the stored values thereof, and the noise level value is initialized to 1.2 times the stored value thereof in step 605.

However, if no measurement value has been stored, the noise level value is initialized to LEVEL_MAX. Here, LEVEL_MAX denotes a gyroscope noise level value computed in a case where vibration is very large, for example, a value of (a measured noise level of an antiquated diesel truck *1.2) in a non-moving state.

In steps 606 to 608, the controller 103 computes a mean value of gyroscope output values in a cycle of 10 ms, and accumulates mean values computed for 100 ms. In more detail, a mean value of gyroscope output values are computed for 10 ms, and the computed mean value is set to a current $X_b$ value in step 606. Subsequently, the controller 103 computes a new Ka value (i.e., Ka=Ka+$X_b$) by adding the current $X_b$ value to a current Ka value serving as a sum of previous $X_b$ values in step 607. Subsequently, the controller 103 checks if 100 ms has elapsed in step 608. If 100 ms has elapsed, the controller 103 returns to step 606 in which a mean value of gyroscope output values is computed for the next 10 ms.

After 100 ms has elapsed, the controller 103 divides the resulting Ka value by 10 to compute a mean value Y[n] and store the computed mean value Y[n] in a buffer in step 609.

Parameters n and Ka are updated in step 610. The parameter Ka is initialized to 0. An equation for computing the parameter n is n=(n+1)%10. Here, "%10" denotes a remainder upon division by 10. When an initial time of 100 ms has elapsed, the parameter n is changed from 0 to 1.

The controller 103 checks if all buffers are initially filled in step 611. Before all buffers are initially filled, that is, Y[0] to Y[9] are stored in 10 buffers because gyroscope output values are measured in a cycle of 10 ms for 100 ms in the embodiment of the present invention, the controller 103 returns to step 606 without proceeding to step 612.

Once the gyroscope output values have been stored in all the buffers, steps 612 to 618 are performed. Then, the controller 103 returns to step 606. Whenever 0.1 seconds elapse, that is, Y[n] is computed where n=0, 1, 2, 3, 4, 5, 6, 7, 8, or 9, after the gyroscope output values have been stored in all the buffers, a range of gyroscope output values (hereinafter, referred to as "Range") stored in the buffers is given as the following Equation 2.

$$\text{Range} = \text{MAX}(Y[0 \ldots 9]) - \text{MIN}(Y[0 \ldots 9]) \quad \text{Equation (2)}$$

In Equation 2, MAX(Y[0 . . . 9]) is a maximum value of Y[0] to Y[9] values, and MIN(Y[0 . . . 9]) is a minimum value of Y[0] to Y[9] values. In accordance with this embodiment, the 10 buffers have a circular structure. In other words, when a new Y[0] value is computed after Y[0] to Y[9] are stored, a previous Y[0] value is deleted, and the new Y[0] value is stored in place of the previous Y[0] value.

In more detail, the controller 103 computes a Range value in step 612, and checks if the computed Range value is less than or equal to a noise level value in step 613. This is performed to check validation of the noise level value. If the computed Range value is less than or equal to a noise level value, the noise level value is set to the minimum value MIN(Range) of Range values computed up to now, and then the noise level value is updated in step 614, but a case where the minimum value MIN(Range) is larger than LEVEL_MAX is excluded. Here, LEVEL_MAX is a value when vibration is very large, for example, a value of (a noise level of an antiquated diesel truck measured in a non-vibration and non-rotation (non-moving) state *1.2).

However, if the computed Range value is larger than the noise level value in step 613, the controller 103 returns to step 606.

After the noise level value is updated in step 614, the controller 103 checks if a count value associated with straight-line traveling is larger than a constant value N representing a smoothing filter constant, or a gyroscope zero point reference value ZPT_Ref stored in the memory 504 is valid. Here, the count value is a value measured using the GPS. If the count value is larger than the constant value N representing the smoothing filter constant, a desired gyroscope zero point reference value can be computed. Because all values stored in the memory 504 may be set to 0 by the electric discharge effect, validation of the values needs to be checked.

If the count value is larger than the constant value or the gyroscope zero point reference value ZPT_Ref stored in the memory 504 is valid, the controller 103 proceeds to step 616. The controller checks if the following Equation 3 is satisfied in step 616.

$$|\text{Mean}(Y[0 \ldots 9]) - ZPT\_Ref| \leq \epsilon \quad \text{Equation (3)}$$

Here, $\epsilon$ is tuned by a system. Typically, $\epsilon$ uses a half value of a true noise level of the gyroscope in the non-vibration state.

If the following Equation 3 is satisfied, or if the count value associated with straight-line traveling is less than or equal to the constant value N representing the smoothing filter constant or the gyroscope zero point reference value ZPT_Ref stored in the memory 504 is invalid, a gyroscope zero point value is updated in step 617. That is, the gyroscope zero point value is set to Mean(Y[0 . . . 9]). The computed gyroscope zero point value and a noise level value corresponding thereto are stored in the memory 504 in step 618. The stored gyroscope zero point value and the stored noise level value can be used when power is turned on later. After step 619 is performed, the controller 103 returns to step 606.

The update of the noise level value will be additionally described using the following Table 1.

TABLE 1

| | Time | | | | | | | |
|---|---|---|---|---|---|---|---|---|
| | 0.9 | 1.0 | 1.1 | 1.2 | 1.3 | 1.4 | 1.5 | 1.6 |
| Noise Level | 10 | 3 | 3 | 3 | 3 | 3 | 3 | 3 |
| Range | 3 | 3 | 3 | 4 | 5 | 4 | 3 | 3 |

In the above Table, the noise level values and the Range values are illustrated for explanation. In the above table, a time period between 0 and 0.9 seconds is not illustrated. Y[0] to Y[9] are computed for the time period of 0~0.9 seconds. After all the values of Y[0] to Y[9] are computed first, Range is computed in a cycle of 0.1 seconds when a time of 1.0 second is reached. It is assumed that Noise Level 10 at a time of 0.9 seconds is LEVEL_MAX as illustrated in the above Table.

If it is assumed that the Range value computed at the time of 1.0 second in step 612 is 3, the Range value of 3 is smaller than the noise level value of 10 when the Range value is compared with the noise level value at the time of 0.9 in step 613. Accordingly, the noise level value is set to the MIN (Range) value in step 614. At this point, because the MIN (Range) value is 3, the noise level value is updated from 10 to 3.

If it is assumed that the Range value computed at the time of 1.2 seconds in step 612 is 4, the Range value of 4 is larger than the noise level value of 3 when the Range value is compared with the noise level value in step 613. Accordingly, the noise level value is not updated. The controller 103 returns to step 606.

According to the above Table, because the noise level value and the Range value in time periods between 0.9 and 1.1 seconds between 1.5 and 1.6 seconds, it is determined that an operating state is a stop state. Because the noise level value is smaller than the Range value in a time period between 1.2 and 1.4 seconds, it is determined that the operating state is a moving state.

Figure 6:
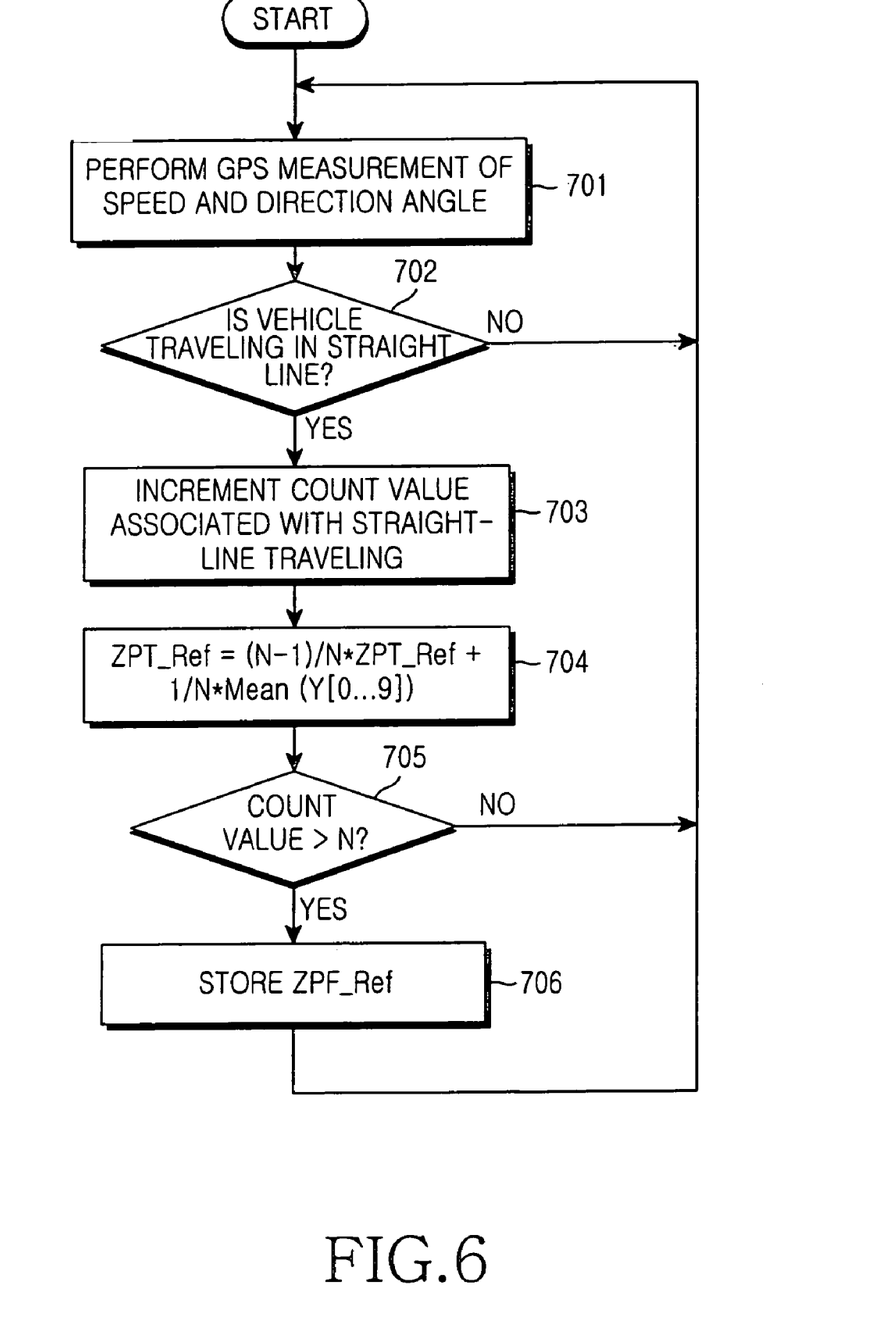
FIG. 6 is a flow chart illustrating a method for measuring a gyroscope zero point reference value ZPT_Ref using a global positioning system (GPS) in accordance with an embodiment of the present invention.

FIG. 6 is a flow chart illustrating a method for measuring a gyroscope zero point reference value ZPT_Ref using the GPS in accordance with an embodiment of the present invention.

In step 701, GPS measurement is performed each second. Accordingly, when a GPS signal is received, a direction angle and a speed of the vehicle can be obtained from the GPS each second.

In step 702, a result of GPS measurement at 1 Hz is analyzed. If the same direction angle of the vehicle at a speed of more than a predetermined value is maintained for several seconds, it is determined that the operating state is a straight-line traveling state. Otherwise, the process returns to step 701.

If it is determined that the operating state is the straight-line traveling state, a count value associated with straight-line traveling is incremented whenever it is determined that the operating state is the straight-line traveling state in step 703. Using the following Equation 4, gyroscope zero point reference values ZPT_Ref are averaged in step 704.

$$ZPT\_Ref=(N-1)/N*ZPT\_Ref+1/N*Mean(Y[0\ldots9]) \quad \text{Equation (4)}$$

In the above Equation 4, ZPT_Ref denotes a gyroscope zero point reference value, and N denotes a smoothing filter constant (e.g., approximately 50). Mean($Y[0 \ldots 9]$) denotes a mean value of $Y[n]$ values. $Y[n]$ denotes an average of an accumulated value Ka obtained by accumulating a mean value $X_b$ of gyroscope output values measured in a predetermined cycle (e.g., 10 ms) the predetermined number of times (e.g., 10 for 100 ms), when it is determined that the operating state is the straight-line traveling state through the GPS.

When it is determined that the operating state is the straight-line traveling state through the GPS, a gyroscope output value is used as a gyroscope zero point reference value. The smoothing filter using the above Equation 4 reduces noise occurring when the vehicle is traveling.

It is determined if a count value associated with the straight-line traveling is larger than N in step 705. If the count value is larger than N, the smoothing filter is stabilized. Accordingly, the gyroscope zero point reference value ZPT_Ref is stored in the memory 504 in step 706. When power is turned on later, the stored value can be used. However, if the count value is less than or equal to N, the process returns from step 705 to step 701.

As illustrated in FIG. 6, the process returns to step 701 after step 706 is performed. This has been made only for a better understanding of the present invention. In practice, GPS measurement is automatically performed each second (with a frequency of 1 Hz) in step 701. In other words, when an operation for storing the gyroscope zero point reference value is completed, step 701 is not necessarily started. It should be noted that a gap between a time taken to perform steps 701 to 706 and a GPS measurement period is negligible.

Figure 7:
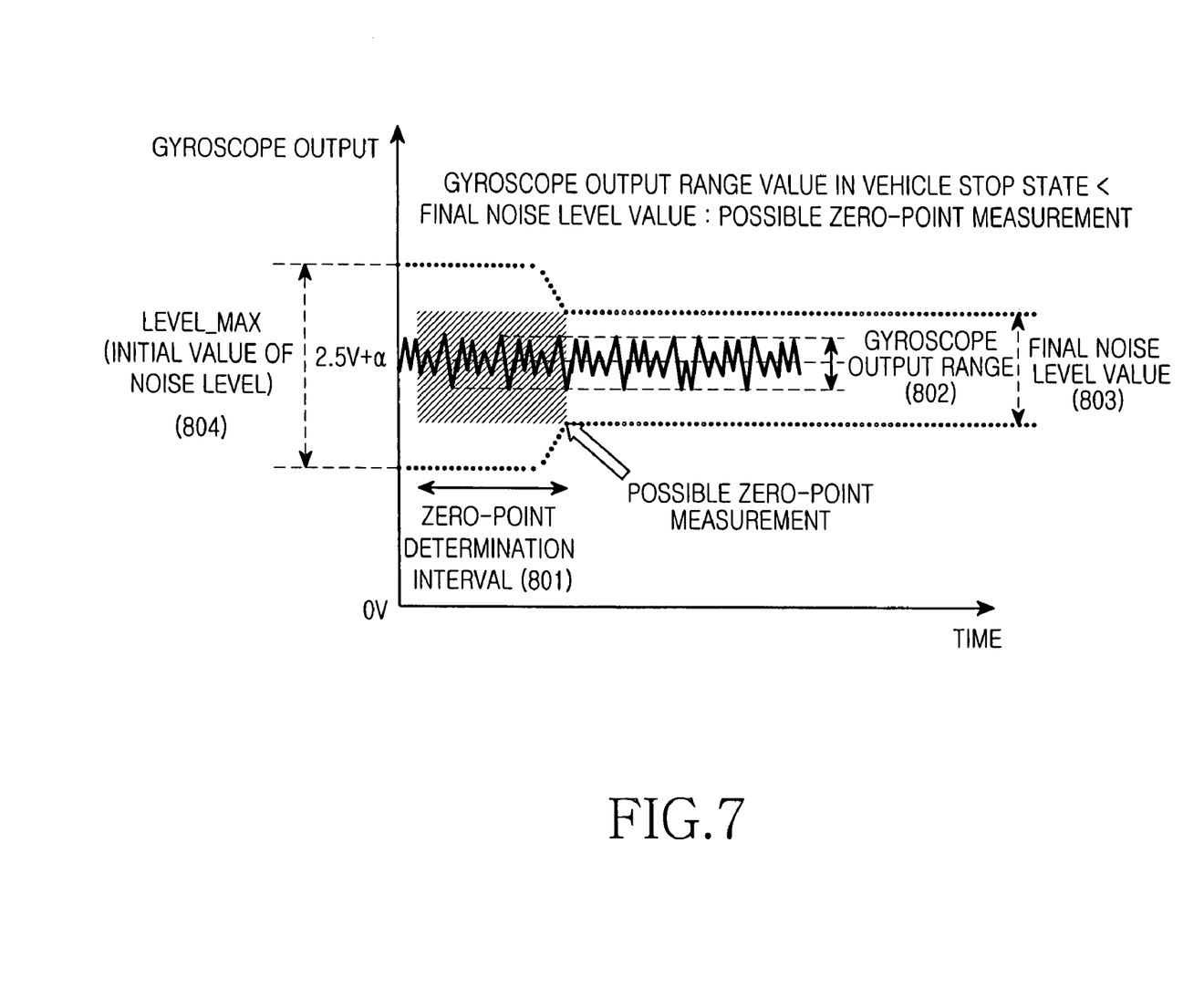
FIG. 7 is a graph illustrating a state in which a gyroscope zero point is successfully set when vibration is small in accordance with an embodiment of the present invention.
Figure 8:
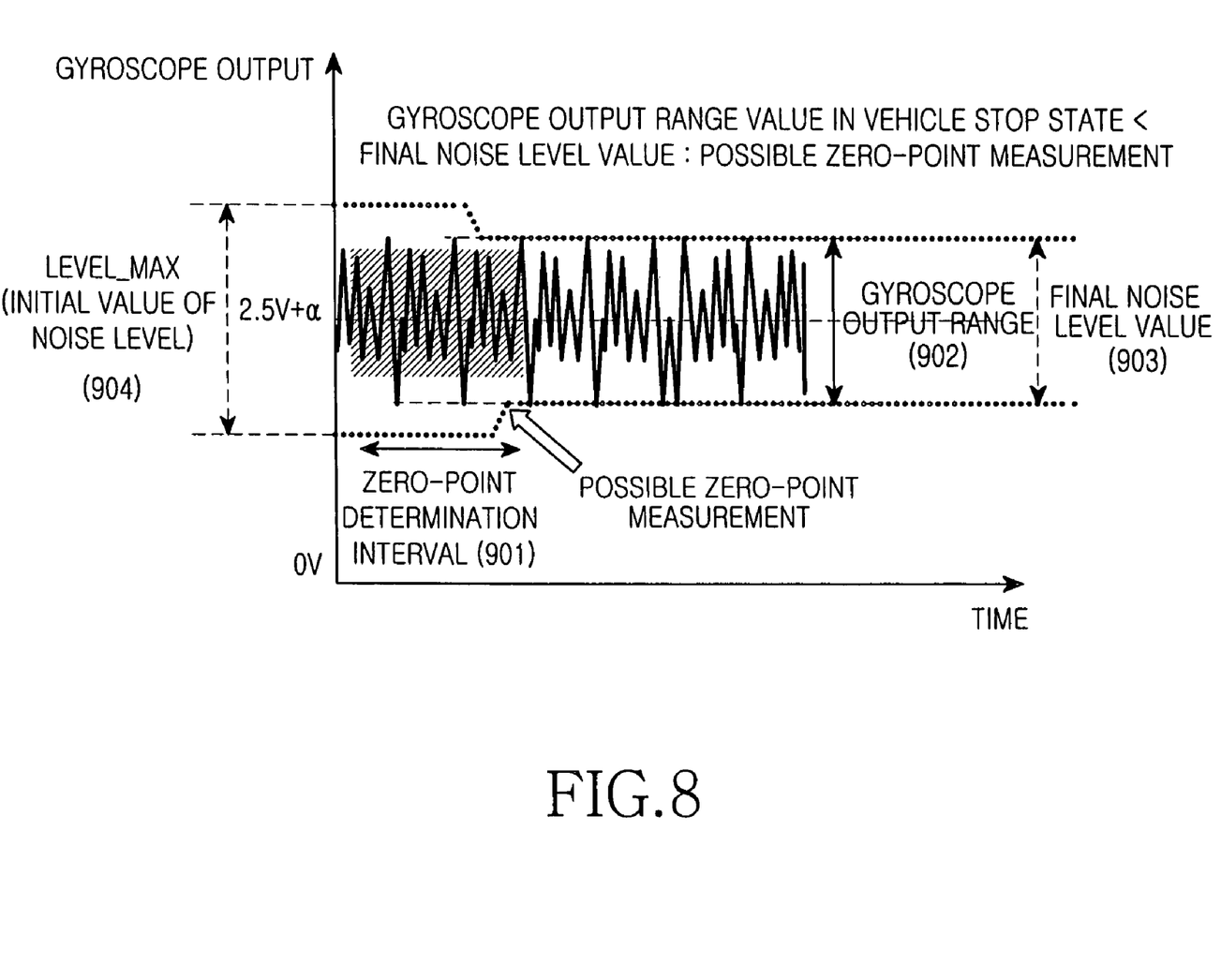
FIG. 8 is a graph illustrating a state in which a gyroscope zero point is successfully set when vibration is large in accordance with an embodiment of the present invention.

FIG. 7 is a graph illustrating a state in which a gyroscope zero point is successfully set when vibration is small in accordance with an embodiment of the present invention. FIG. 8 is a graph illustrating a state in which a gyroscope zero point is successfully set when vibration is large in accordance with an embodiment of the present invention.

Both cases successfully set a zero point (as indicated by reference numerals 801 and 901), using an initial value of a noise level LEVEL_MAX (indicated by reference numeral 804 in FIG. 7 and reference numeral 904 in FIG. 8) and a gyroscope output range (indicated by reference numerals 802 and 902 in FIGS. 7 and 8, respectively). The final noise level value (indicated by reference numerals 803 and 903 in FIGS. 7 and 8, respectively) can be determined such that it is appropriate to a vibration environment. Accordingly, an application range of after-market telematics terminals can be extended to vehicles with a diesel engine (e.g., recreational vehicles, trucks, etc.) as well as passenger cars (e.g., gasoline and gas-fueled vehicles with small vibration) in accordance with the present invention.

Because the present invention can exactly determine a noise level to set a gyroscope zero point in an environment in which a gyroscope is installed, it has a higher probability of successfully setting a gyroscope zero point as compared with the prior art. The present invention can successfully set the gyroscope zero point under both small and large vibration, thereby extending an application range of the after-market telematics terminals to vehicles with a diesel engine as well as general passenger cars.

More specifically, because the present invention checks the validation of a gyroscope zero point using a gyroscope zero point reference value determined through a GPS, it can reduce the probability of erroneously determining the gyroscope zero point. Accordingly, the present invention is useful in an environment with large vibration in which a noise level is determined to be large.

The present invention can maintain and store a measured gyroscope zero point value, a measured noise level value, a measured gyroscope zero point reference value, etc. in a memory. When power is shut off and then turned on later, the present invention can use the values stored in the memory, thereby increasing the probability of successfully measuring a gyroscope zero point and reducing a measurement time. Accordingly, the present invention is very useful in a device in which an operation system is mounted. Because several seconds are taken to boot the operation system, the gyroscope zero point can be determined only when the operating state is maintained in a stop state for a predetermined time period after a vehicle is started in the prior art, such that a driver is significantly inconvenienced. However, because the present invention can use a gyroscope zero point value stored in the memory, the gyroscope zero point can be successfully set even though the driver drives the vehicle immediately after the vehicle is started.

Although certain embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. An apparatus for setting a gyroscope zero point reference value, comprising:
   a gyroscope for outputting a signal indicating angular velocity in the form of a voltage;
   a global positioning system (GPS) receiver for receiving a GPS signal;

an analog-to-digital (A/D) converter for digitizing the voltage output from the gyroscope; and a controller for detecting a speed and a direction angle of a vehicle from the received GPS signal, determining if the vehicle is traveling in a straight line, and filtering the voltage output from the gyroscope to obtain a gyroscope zero point reference value if the vehicle is traveling in the straight line, wherein the gyroscope zero point reference value is computed by ZPT_Ref=(N−1)/N*ZPT_Ref+1/N*Mean(Y[0 ... 9]), where ZPT_Ref denotes a gyroscope zero point reference value, N denotes a smoothing filter constant, and Mean(Y[0 ... 9]) denotes a mean value of Y[0] to Y[9] values, each of the Y[0] to Y[9] values being an average of an accumulated value obtained by accumulating a mean value of gyroscope output values measured in a predetermined cycle a predetermined number of times.

2. The apparatus according to claim 1, further comprising:
a memory for storing the gyroscope zero point reference value.

3. A method for setting a gyroscope zero point reference value, comprising:

checking global positioning system (GPS) measurement in a predetermined cycle;

determining if a vehicle is traveling in a straight line from a result of the GPS measurement, incrementing a count value associated with the straight-line traveling if the vehicle is traveling in the straight line, and computing a gyroscope zero point reference value according to ZPT_Ref=(N−1)/N*ZPT_Ref+1/N*Mean(Y[0 ... 9]) where ZPT_Ref denotes a gyroscope zero point reference value, N denotes a smoothing filter constant, and Mean(Y[0 ... 9]) is a mean value of Y[0] to Y[9] values, each of the Y[0] to Y[9] values being an average of an accumulated value obtained by accumulating a mean value of gyroscope output values measured in a predetermined cycle a predetermined number of times; and determining the count value associated with the straight-line traveling after computing the gyroscope zero point reference value, storing the computed gyroscope zero point reference value in a memory if the count value is larger than N, and waiting for the cycle to be reached if the count value is less than or equal to N.

4. An apparatus for setting a gyroscope zero point, comprising:

a gyroscope for outputting a signal indicating angular velocity in the form of a voltage;

a global positioning system (GPS) receiver for receiving a GPS signal;

an analog-to-digital (A/D) converter for digitizing the voltage output from the gyroscope; and a controller for analyzing the GPS signal, determining if a vehicle is traveling in a straight line, obtaining a gyroscope zero point reference value, comparing a gyroscope output range value with a noise level value in a predetermined cycle, and updating a gyroscope zero point when the gyroscope output range value is less than or equal to the noise level value, wherein the gyroscope output range value is computed by Range=MAX(Y[0 ... 9])−MIN(Y[0 ... 9]), where MAX(Y[0 ... ]) is a maximum value of Y[0] to Y[9] values, and MIN(Y[0 ... 9]) is a minimum value of the Y[0] to Y[9] values, each of the Y[0] to Y[9] values being an average of an accumulated value obtained by accumulating a mean value of gyroscope output values measured in a predetermined cycle the predetermined number of times, and wherein the noise level value is updated to a minimum value of computed gyroscope output range values whenever the gyroscope output range value is less than or equal to the noise level value.

5. The apparatus according to claim 4, further comprising:
a memory for storing a value of the gyroscope zero point, the noise level value, and the gyroscope zero point reference value.

* * * * *